United States Patent [19]

Vo et al.

[11] Patent Number: 6,044,274
[45] Date of Patent: Mar. 28, 2000

[54] HANDLING OF MOBILE ORIGINATED INTELLIGENT NETWORK CALLS FROM A NON-INTELLIGENT CAPABLE MOBILE SWITCHING CENTER

[75] Inventors: Kim Phuong Vo; Vu Nguyen, both of Mount Royal, Canada

[73] Assignee: Telefonaktiebolaget LM Ericsson, Stockholm, Sweden

[21] Appl. No.: 08/800,014

[22] Filed: Feb. 13, 1997

[51] Int. Cl.[7] .................................................. H04Q 7/14
[52] U.S. Cl. ........................ 455/461; 455/445; 455/433
[58] Field of Search ................................... 455/461, 433, 455/445, 435, 448; 432/432

[56] References Cited

U.S. PATENT DOCUMENTS

| | | | |
|---|---|---|---|
| 5,153,907 | 10/1992 | Pugh et al. | 379/88.25 |
| 5,212,727 | 5/1993 | Ramkumar . | |
| 5,319,699 | 6/1994 | Kerihuel et al. | 379/58 |
| 5,345,502 | 9/1994 | Rothenhöfer . | |
| 5,400,390 | 3/1995 | Salin | 455/433 |
| 5,430,719 | 7/1995 | Weisser, Jr. . | |
| 5,438,568 | 8/1995 | Weisser, Jr. . | |
| 5,610,972 | 3/1997 | Emery et al. | 455/461 |
| 5,673,308 | 9/1997 | Akhavan | 455/461 |
| 5,805,997 | 1/1996 | Farris | 455/461 |
| 5,806,000 | 9/1998 | Vo et al. | 455/466 |
| 5,839,072 | 11/1998 | Chien | 455/445 |
| 5,845,211 | 1/1995 | Roach, Jr. | 455/435 |
| 5,901,359 | 1/1997 | Malmstrom | 455/461 |
| 5,905,954 | 5/1999 | Nguyen | 455/433 |
| 5,915,222 | 12/1996 | Olsson et al. | 455/466 |

FOREIGN PATENT DOCUMENTS

| | | |
|---|---|---|
| 0 602 781 A2 | 6/1994 | European Pat. Off. . |
| 0 714 214 A2 | 5/1996 | European Pat. Off. . |
| 0 715 473 A2 | 6/1996 | European Pat. Off. . |
| WO 95/26114 | 9/1995 | WIPO . |
| WO 97/23107 | 6/1997 | WIPO . |

Primary Examiner—Edward F. Urban
Assistant Examiner—Tilahun Gesesse
Attorney, Agent, or Firm—Burns, Doane, Swecker & Mathis, L.L.P.

[57] ABSTRACT

In a cellular mobile telecommunication system, an intelligent network service subscriber can place an originating intelligent network (IN) service call from an area that is not supported by an IN capable mobile switching center. After determining that the call is an IN service call, the non-IN capable mobile switching center will forward the call to a specially configured IN gateway which is programmed to notify the IN subscriber's home location register and service control point. The home location register and service control point then return the appropriate routing instructions to the IN gateway, which in turn forwards the originating IN service call to the intended party.

11 Claims, 5 Drawing Sheets

HANDLING OF MOBILE ORIGINATED INTELLIGENT NETWORK CALLS FROM A NON-INTELLIGENT CAPABLE MOBILE SWITCHING CENTER

BACKGROUND

The present invention relates to cellular mobile telecommunication systems. More particularly, the present invention relates to cellular mobile telecommunication systems that provide intelligent network (IN) services.

A typical cellular mobile telecommunication system comprises a plurality of geographic regions called cells. For example, the cellular mobile telecommunication system 100 depicted in FIG. 1 includes ten cells C1–C10. The cells are generally grouped into larger geographic regions called location areas (LAs). For illustrative purposes, cells C1–C10 are grouped into two such areas, LA1 and LA2, wherein LA1 includes cells C1–C5 and LA2 includes cells C6–C10.

Each cell contains at least one base station transceiver (BST), e.g., BST B1–B10, and each location area contains one or more mobile switching centers (MSCs), e.g., MSC1 and MSC2. Typically, each MSC is connected to several BSTs within the corresponding location area. A BST e.g., B1, communicates directly with the mobile units located in the corresponding cell, e.g., M1 and M2. The primary function of a MSC, however, is to execute the switching requirements necessary to properly route calls between a mobile unit located in one cell (e.g., M1) and a mobile unit located in another cell (e.g., M3). In addition, a MSC may be connected to a public switching telephone network (PSTN). Therefore, MSCs also facilitate the routing of calls between a mobile unit and a fixed telephone terminal connected to the PSTN.

Each mobile unit is associated with a particular "home" LA. Accordingly, the one or more MSCs servicing the "home" area will be responsible for handling the switching and routing of calls to and from each of these associated mobile units, so long as the mobile units are physically located in the "home" LA. If, however, a mobile unit travels into a second LA, the one or more MSCs servicing the second LA will become responsible for providing the switching and call routing requirements for the mobile unit. When a mobile unit enters a LA other than its "home" LA, the mobile unit is said to be "roaming."

There are a number of cellular system components used in providing a mobile unit with the capability of transmitting and receiving communications while roaming. Referring now to FIG. 2, one such additional system component is the home location register (HLR) 205. The HLR 205 is essentially a database associated with one or more MSCs in a given LA. The HLR 205 maintains a user record for each of a number of mobile units associated with the corresponding area; these mobile units are said to be assigned to the HLR 205. Each record contains, among other things, an identification code for the corresponding mobile unit, information regarding the type of service associated with that mobile unit, and information defining the current location of the mobile unit. Consequently, when a mobile unit roams into a second LA (i.e., a LA other than its "home" LA), the record for that mobile unit stored in the HLR 205 will be updated to reflect the mobile units new location, so that incoming calls can be properly forwarded to the mobile unit in the second LA.

Another system component that is used in providing a mobile unit with the capability to transmit and receive calls while roaming is the visiting location register (VLR) 210. The VLR 210 is also a database, and it is typically associated with an MSC, e.g., MSC 207. Unlike the HLR 205, the VLR 210 maintains a user record for each visiting mobile unit, for example mobile unit 215 (i.e., those mobile units currently located in the corresponding LA, though permanently assigned to a HLR located in another LA). When a mobile unit, for example mobile unit 215, roams into the LA, a record identifying that mobile unit will be established in the VLR 210. When the mobile unit 215 leaves the LA, the record in the VLR 210 is deleted.

In addition to basic cellular service, many cellular systems also provide IN services, which may include the ability to place originating IN calls. For example, an originating IN call might involve placing a call to a fixed telephone terminal by dialing only a four digit extension rather than the entire seven or ten digit phone number. Those skilled in the art will recognize that this service is often referred to as a private numbering plan.

As illustrated in FIG. 3, an additional system component, referred to as a service control point (SCP) 305, is needed to provide IN services. More particularly, the SCP 305 maintains the specific call routing instructions needed by the MSC 310 to properly route an IN service call for an IN subscriber assigned to HLR 315. In FIG. 3, MSC 310 is said to be an IN capable MSC.

However, not all MSCs in a cellular system are IN capable (i.e., capable of receiving and executing the IN call routing instructions maintained by the SCP). This is most troublesome for IN subscribers when they roam into areas that are serviced by non-IN capable MSCs. When this does occur, the IN subscriber is unable to place an originating IN service call. Therefore, a need exists to provide IN subscribers with a way to access their IN services even when the IN subscriber (i.e., the mobile unit) roams into an area serviced by a non-IN capable MSC.

SUMMARY

It is an object of the present invention to provide a cellular mobile telecommunication system that permits a cellular IN subscriber to gain access to IN services at all times.

It is another object of the present invention to provide a cellular mobile telecommunication system that permits a cellular IN subscriber to place originating IN service calls anywhere within the coverage area of the cellular mobile telecommunication system.

It is another object of the present invention to provide a cellular mobile telecommunication system that permits a cellular IN subscriber to place originating IN service calls whether the corresponding mobile unit is located in an area that is serviced by an IN capable MSC or located in an area that is serviced by a non-IN capable MSC.

In accordance with one aspect of the present invention, the foregoing and other objects are achieved by a system and/or method for routing an originating IN service call for an IN services subscriber from a geographic region of a cellular mobile telecommunication system that is not supported by an IN capable mobile switching center (MSC). The system and/or method involves routing the originating call from the non-IN capable MSC to an IN gateway. The IN gateway, in turn, is capable of receiving the IN service call instructions needed to correctly route the call from a corresponding service control point. The IN gateway then forwards the originating IN call accordingly.

In accordance with another aspect of the present invention, the foregoing and other objects are achieved by a system and/or method for routing an originating IN service call to a desired party from within a geographic region serviced by a non-IN capable mobile switching center (MSC). The system and/or method involves identifying the home location register (HLR) for the calling party, then routing the originating IN call to an IN gateway associated with the non-IN capable MSC. The IN gateway then transmits an IN service call access message to a corresponding service control point (SCP) associated with the HLR. Upon receiving a result from the SCP, wherein the result contains the IN call routing instructions for the IN call, the IN gateway forwards the originating IN service call to the desired party.

BRIEF DESCRIPTION OF THE DRAWINGS

The objects and advantages of the invention will be understood by reading the following detailed description in conjunction with the drawings in which.

DETAILED DESCRIPTION

Figure 1:
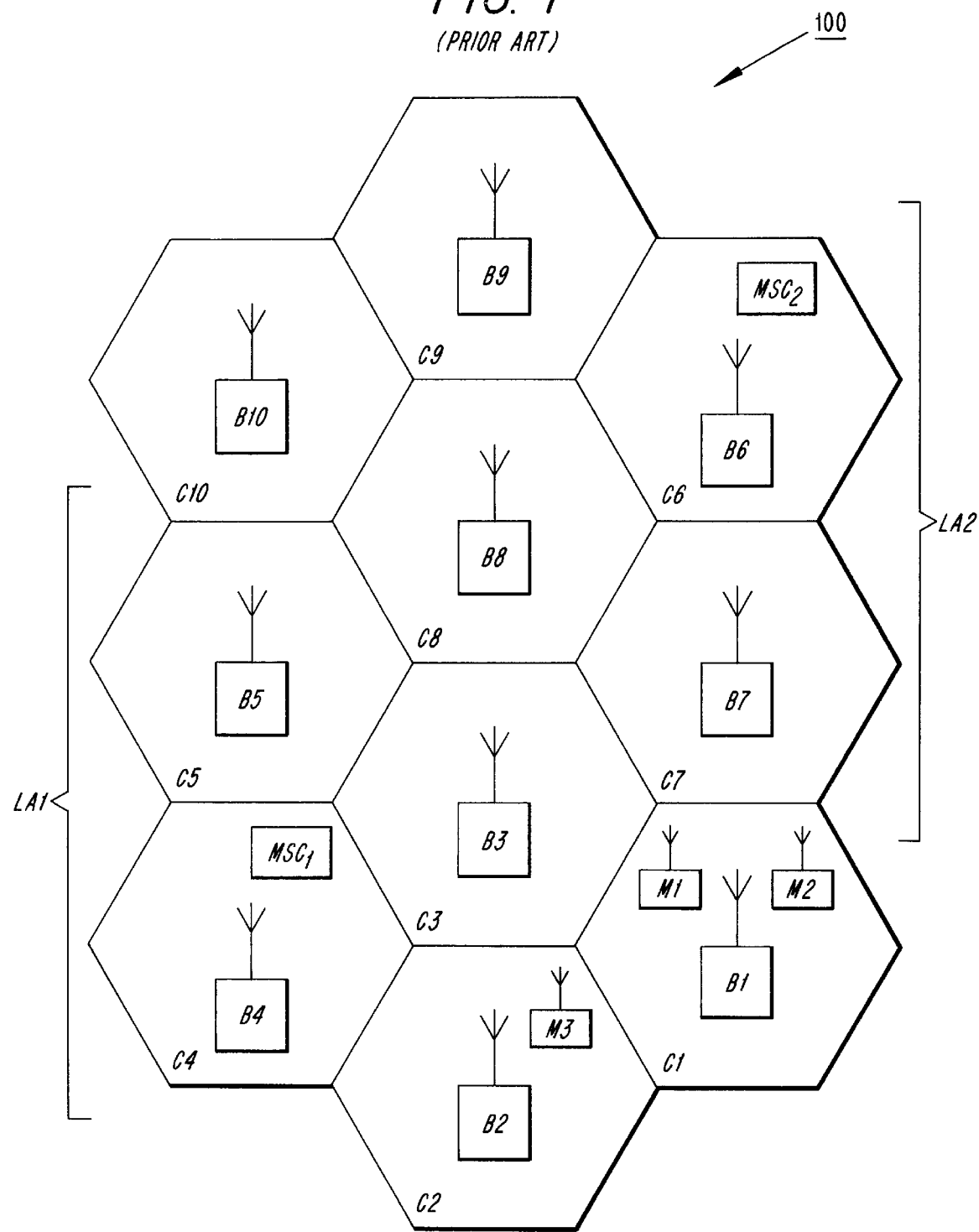
FIG. 1 depicts a typical cellular mobile telecommunication system in accordance with the prior art.
Figure 2:
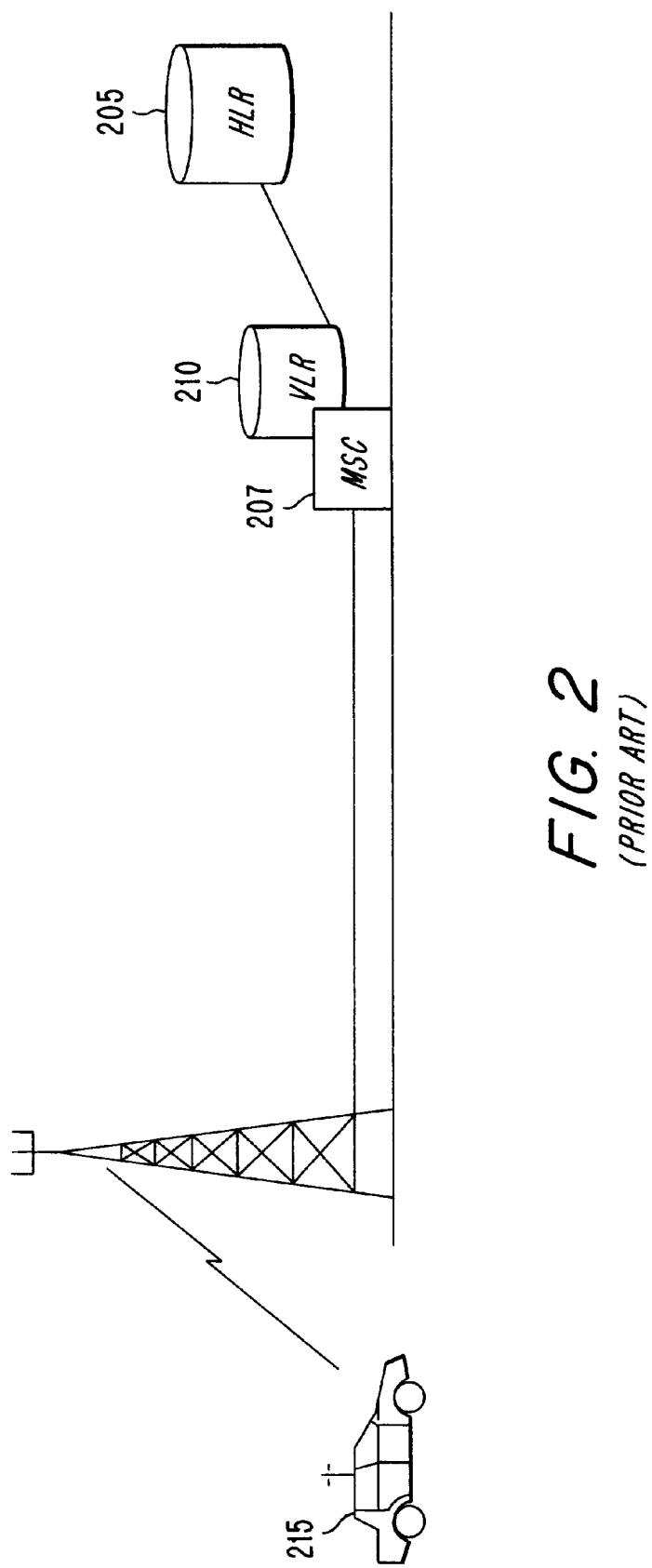
FIG. 2 illustrates some of the cellular system components used for tracking the location of mobile units in accordance with the prior art.
Figure 3:
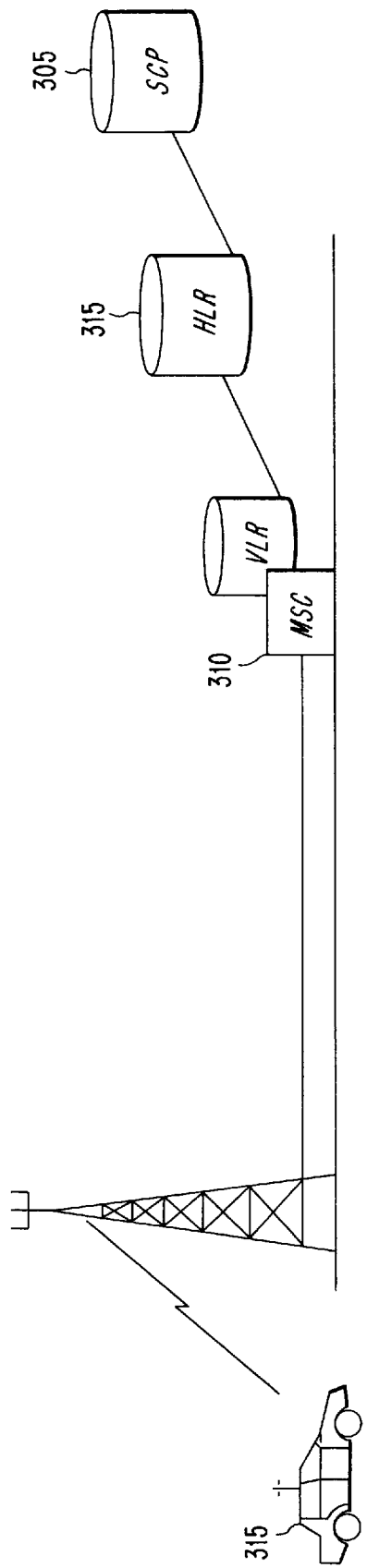
FIG. 3 illustrates the cellular system components used for providing IN services in accordance with the prior art.

The various features of the invention will now be described with respect to the figures, in which like parts are identified with the same reference characters.

Figure 4:
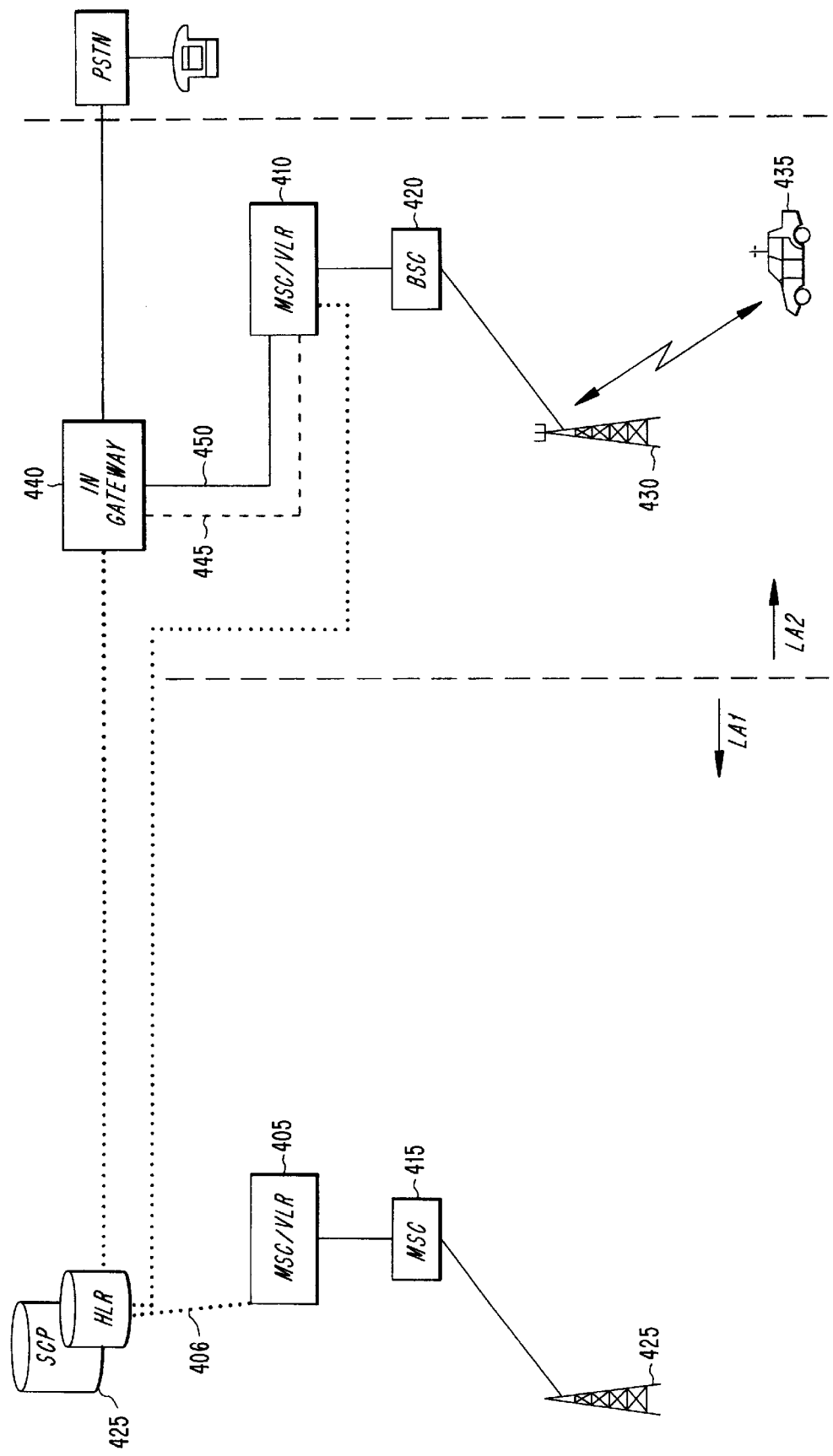
FIG. 4 shows the configuration of a cellular mobile telecommunication system in accordance with a preferred embodiment of the present invention.

FIG. 4 shows an exemplary configuration for two location areas LA1 and LA2 in a cellular mobile telecommunication system, in accordance with a preferred embodiment of the present invention, wherein LA1 is serviced by an IN service capable MSC/VLR 405, and wherein LA2 is supported by a non-IN service capable MSC/VLR 410. LA1 and LA2 are similar in that both comprise base station controllers 415 and 420, which in turn control the communication links between the MSC/VLR 405 and 410, and the corresponding base station transceivers, for example, base station transceivers 425 and 430. However, despite the fact that MSC/VLR 405 and MSC/VLR 410 both maintain a communication link 406 and 411 respectively with the HLR/SCP 426, only the MSC/VLR 405 is configured to support IN services using IN service call information provided by the SCP. In contrast, MSC/VLR 410 is not configured to support, by itself, IN services.

A mobile unit 435, which is an IN subscriber assigned to the HLR/SCP 425, can, nevertheless, place originating IN service calls even when roaming in LA2, an area which is supported by a non-IN capable MSC/VLR 410, as stated above. This capability is made possible by the inclusion of an IN gateway 440. The IN gateway 440 is similar to an MSC, but for it has the capability of interrogating cellular system components located in other areas, in particular, HLR/SCP 425. It is also capable of rerouting originating IN service calls in accordance with the routing instructions provided by the HLR/SCP 425, as will be explained in greater detail below.

Although FIG. 4 depicts the IN gateway 440 to be located in LA2, IN gateway 440 could, in an alternative embodiment, be located in a third LA, wherein the novel functions provided by the IN gateway 440 are shared by a number of non-IN capable MSC/VLRs. Additionally, the IN gateway 440 need not be a device that is dedicated to routing originating IN calls. For example, if LA2 already contains an existing gateway MSC (a cellular system component that is well known in the art), the gateway MSC could be preprogrammed to provide, in addition to its other functions, the novel functions of the IN gateway 440 as described herein. Moreover, while LA1 and LA2 intentionally represent two separate location areas serviced by two separate MSC/VLRs 405 and 410, the capability provided by the present invention could be applied throughout a single LA serviced by more than one MSC, wherein some of the MSCs are IN capable MSCs and some of the MSCs are non-IN capable MSCs.

Figure 5:
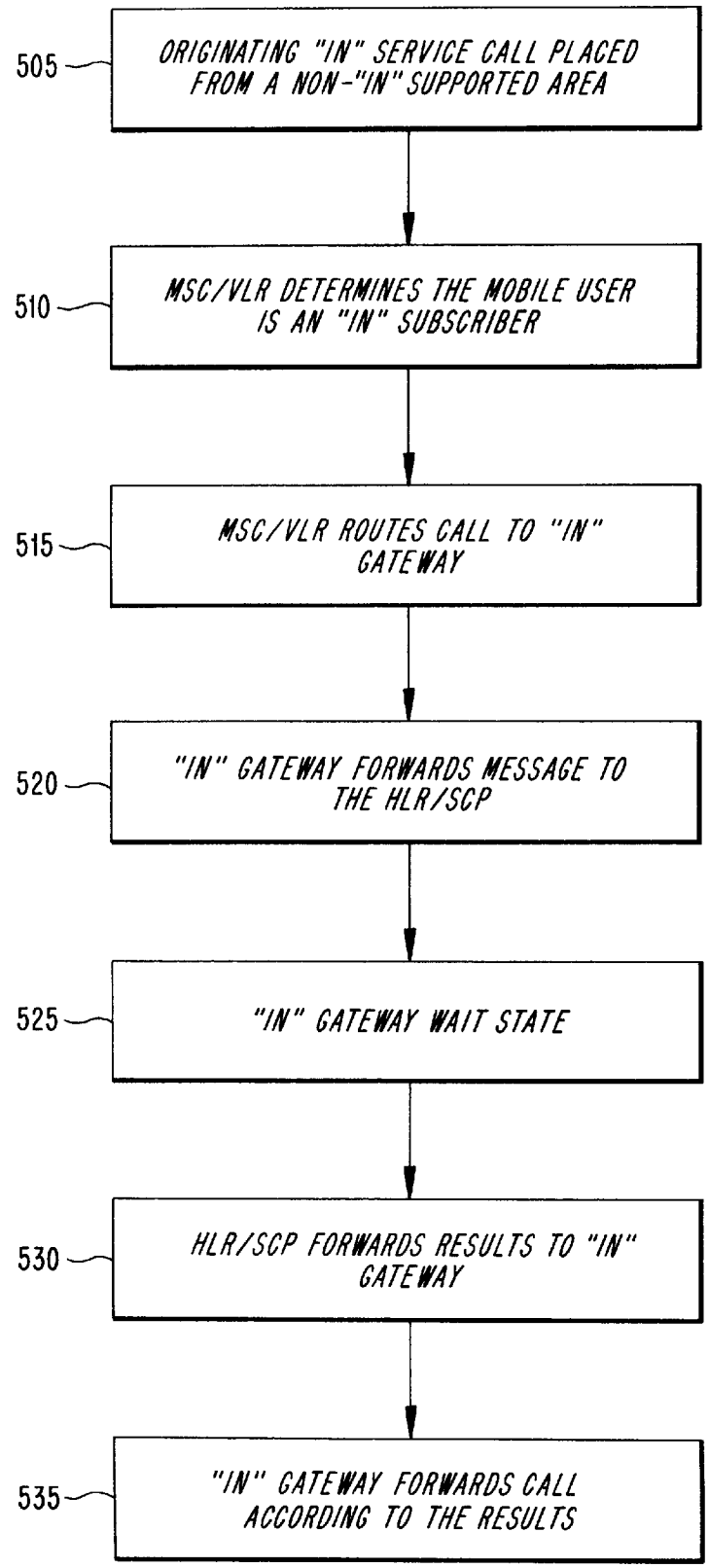
FIG. 5 is a flowchart which reflects a method in accordance with a preferred embodiment of the present invention.

FIG. 5 is a flowchart depicting the steps of a method 500 in accordance with a preferred embodiment of the present invention. The method 500 is initiated when an originating IN service call is placed by an IN subscriber (e.g., mobile unit 435) from a geographic location (e.g., LA2) that is serviced by a non-IN capable MSC/VLR (e.g., 410) as illustrated by block 505.

Once the IN subscriber places the originating IN service call, the MSC/VLR 410 must establish that the mobile unit is, in fact, an IN subscriber, as illustrated by block 510. As stated above, the VLR is a database that maintains a record for each visiting mobile unit. In the case of mobile unit 435, the record maintained in the VLR will specifically indicate that mobile unit 435 is an IN subscriber.

As the MSC/VLR 410 by itself does not have the capability to properly route an originating IN service call, the MSC/VLR 410 forwards the call to the IN gateway 440, in accordance with block 515. However, since the IN gateway 440 may perform functions other than those involving the routing of IN service calls, as stated above, it is necessary that IN gateway 440 be able to recognize the call as an originating IN service call. This can be accomplished by forwarding the call from the MSC/VLR 410 to the IN gateway 440 over a dedicated trunk 445, while all non-IN calls are forwarded to the IN gateway over a non-IN dedicated trunk 450. In an alternative embodiment, all calls, including both IN calls and non-IN calls can be forwarded from the MSC/VLR 410 to the IN gateway 440 over a non-dedicated trunk. However, in this latter alternative embodiment, the MSC/VLR 410 will append a special code to the IN call B-number so that the IN gateway 440 can distinguish the IN call from non-IN calls. For example, if the B-number is 5555, the MSC/VLR 410 might actually forward the number *515555, wherein *51 represents a special code that has been appended to the B-number to identify the call as an originating IN call for the IN gateway 440.

In addition to forwarding the B-number to the IN gateway 440, the MSC/VLR 410 must also forward the mobile unit subscriber identification information so that the IN gateway 440 can identify the HLR/SCP to which the mobile unit 435 is assigned. With this information, the IN gateway 440 can correctly forward an originating IN access message to the appropriate HLR/SCP (i.e., HLR/SCP 425), as illustrated by block 520. This message provides the HLR/SCP 425 with the information necessary to determine the appropriate call routing instructions.

After the IN gateway 440 forwards the originating IN access message to the HLR/SCP 425, the IN gateway goes into a "wait state", as illustrated by block 525, until the HLR/SCP 425 returns a "result" for the previously transmitted IN access message, as illustrated by block 530. The "result" will contain the specific information needed by the IN gateway 440 to properly forward the originating IN call to the intended party, despite the fact that the call originated from within an area unsupported by an IN capable MSC. For example, the "result" may simply be a complete, routable B-number (e.g., 1-800-555-5555).

The present invention has been described with respect to a preferred embodiment. However, it will be readily apparent to those skilled in the art that it is possible to embody the invention in specific forms other than those of the preferred embodiment described above. This may be done without departing from the spirit of the invention. The preferred embodiment should not be considered restrictive in any way. The scope of the invention is given by the appended claims, rather than the preceding description, and all variations and equivalents which fall within the range of the claims are intended to be embraced therein.

What is claimed is:

1. A cellular mobile telecommunication system comprising:
    a non-intelligent network (non-IN) capable mobile switching center (MSC);
    an intelligent network (IN) gateway connected to said non-IN capable MSC;
    a home location register (HLR) connected to said IN gateway; and
    a service control point, connected to said HLR, for storing and transferring IN service call routing instructions to said IN gateway, for an IN subscriber assigned to said HLR,
    wherein said IN gateway forwards an originating IN service call from an IN subscriber being serviced by said non-IN capable MSC in accordance with the call routing instructions transferred from said service control point, and
    wherein the connection between said IN gateway and said non-IN capable MSC comprises a communication trunk for transmitting both originating IN service calls and non-IN service calls, and wherein the IN service calls include a special code that identifies them as IN calls.

2. A cellular telecommunication system comprising:
    an intelligent network (IN) capable mobile switching center (MSC);
    a home location register (HLR) connected to said IN capable MSC;
    a service control point (SCP), connected to said HLR, for storing IN service call routing instructions for IN subscribers assigned to said HLR;
    a non-intelligent network (non-IN) capable MSC; and
    IN gateway means for routing originating IN service calls for IN subscribers being serviced by said non-IN capable MSC, based on the IN service call instructions received from said SCP, wherein said IN gateway means is connected to said non-IN capable MSC and said HLR, and wherein said IN gateway means comprises interrogation means for notifying said HLR and said SCP that an originating IN call has been placed by an IN subscriber assigned to said HLR, and
    wherein said connection between said IN gateway means and said non-IN capable MSC is a non-dedicated communication trunk for transmitting both originating IN service calls and non-IN service calls generated from within a the geographic region serviced by said non-IN capable MSC, and wherein the originating IN service calls are appended with a special code that identifies them as IN calls.

3. The system in accordance with claim 2, wherein said system further comprises a visiting location register connected to said non-IN capable MSC, wherein said VLR maintains user records for visiting IN subscribers.

4. The system in accordance with claim 2, wherein said IN gateway means is located in a geographical region serviced by said non-IN capable MSC.

5. The system in accordance with claim 2, wherein said IN gateway means is located outside a geographical region serviced by said non-IN capable MSC.

6. A method for routing an originating intelligent network (IN) service call from a geographic region of a cellular mobile telecommunication system that is supported by a non-IN capable mobile switching center (MSC), said method comprising the steps of:
    routing the call from the non-intelligent network (non-IN) capable MSC to an IN gateway, wherein said step of routing the call from the non-IN capable MSC to the TN gateway comprises the steps of:
        appending a special code to a B-number in the originating IN service call; and
        transmitting the originating IN service call over a non-dedicated communication trunk,
        wherein the special code identifies the call as an IN calls;
    in the IN gateway, receiving call routing instructions from a service control point; and
    forwarding the originating IN call through the IN gateway in accordance with the routing instructions received from the service control point.

7. In a cellular mobile telecommunication system, a method for routing an originating intelligent network (IN) service call to a desired party comprising the steps of:
    generating an originating IN service call for a calling party located in a geographic region that is serviced by a non-intelligent network (non-IN) capable mobile switching center (MSC);
    identifying a home location register (HLR) to which the calling party is assigned;
    routing the IN service call to an IN gateway, wherein the step of routing the IN service call to the IN gateway comprises the steps of:
        generating a special code;
        transmitting the special code, a subscriber identification number and the originating IN service call from the non-TN capable MSC to the TN gateway over a non-dedicated communication trunk,
        wherein the special code identifies the call as an IN call;
    transmitting an originating IN service call access message from the IN gateway to a service control point (SCP) associated with the HLR;
    in the IN gateway, receiving a result from the SCP in response to the IN service call access message; and
    routing the originating IN service call from the IN gateway to the desired party in accordance with the result.

8. The method of claim 7, further comprising the step of:
    determining whether the calling party is an IN subscriber in accordance with a user record stored in a visiting location register.

9. The method of claim 7, wherein the IN gateway is located in the same geographic region that the non-IN capable MSC is located.

10. The method of claim 7, wherein the IN gateway is located in a geographic region other than the geographic region in which the non-IN capable MSC is located.

11. The method of claim 10, wherein the IN gateway services a plurality of non-IN capable MSCs.

* * * * *